United States Patent [19]
Kawaguchi et al.

[11] 3,922,465
[45] Nov. 25, 1975

[54] SOLDERABLE AND THERMOSTABLE INSULATED WIRES

[75] Inventors: Munetake Kawaguchi; Hirohiko Nakabayashi, both of Osaka, Japan

[73] Assignee: Sumitomo Electric Industries, Ltd., Osaka, Japan

[22] Filed: Jan. 28, 1974

[21] Appl. No.: 437,083

[30] Foreign Application Priority Data
Jan. 26, 1973  Japan................................ 48-11377

[52] U.S. Cl. .............. 428/383; 260/75 N; 427/117; 427/118; 428/379
[51] Int. Cl.². ....................... H01B 3/30; C08G 73/10
[58] Field of Search..... 117/218, 232, 128.4, 161 K, 117/161 P; 427/117, 118; 428/379, 383; 260/75 N

[56] References Cited
UNITED STATES PATENTS

| | | |
|---|---|---|
| 3,306,771 | 2/1967 | Schmidt et al....................... 117/218 |
| 3,361,593 | 1/1968 | Sattler et al. ........................ 117/218 |
| 3,458,480 | 7/1969 | Schmidt et al.................. 117/232 X |
| 3,475,212 | 10/1969 | Bach............................... 117/232 X |
| 3,707,403 | 12/1972 | Dobbelstein et al................. 117/218 |
| 3,732,168 | 5/1973 | Ottmann et al..................... 117/232 |
| 3,793,250 | 2/1974 | Schmidt et al.................. 117/232 X |

*Primary Examiner*—Ralph Husack
*Attorney, Agent, or Firm*—Sughrue, Rothwell, Mion, Zinn & Macpeak

[57] ABSTRACT

A solderable and thermostable insulated wire which comprises an insulating layer as an under layer which is formed by applying a polyester-imide wire enamel (which may include polyester imide or polyesteramide-imide and has 5-membered imide groups and ester bonds in the molecule) to a conductor and baking, wherein the polyester-imide wire enamel mainly comprises the reaction product of (A) a dibasic carboxylic acid free of a 5-membered imide ring, a derivative thereof or a mixture thereof, (B) a dibasic carboxylic acid which has at least one 5-membered imide ring, a derivative thereof or a mixture thereof, (C) a tri- and/or higher-hydric aliphatic alcohol and (D) a dihydric alcohol, and an insulated layer as an over layer which is formed by applying a polyimide wire enamel or a polyamide-imide wire enamel to the under layer and baking.

2 Claims, 1 Drawing Figure

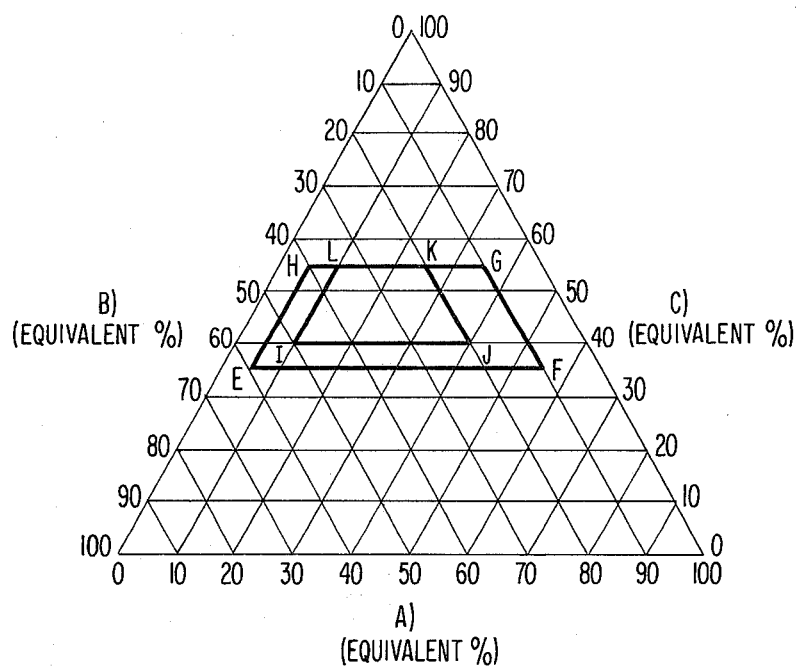

SOLDERABLE AND THERMOSTABLE INSULATED WIRES

BACKGROUND OF THE INVENTION

1. FIELD OF THE INVENTION

This invention relates to solderable and thermostable insulated wires.

2. DESCRIPTION OF THE PRIOR ART

In recent years, there has been a growing tendency for electrical machines, such as motors or transformers, to be constructed in smaller sizes and lighter weights, and it is desired to increase the reliability of the machines. Accordingly, finer and higher performance insulated wires or magnet wires used in these electric machines have been desired. In order for the electric machines to be smaller in size, it is necessary to attenuate the insulated wires. It is not sufficient, however, to use the same insulating materials as in the prior art because, even when the machinery is reduced in size, the same performance as, or a greater performance than, the conventional machinery is required, and a higher load is exerted on the attenuated insulated wires. Naturally, the insulating material must have a higher performance. With such a background, highly thermostable materials have been developed for use in producing thermostable insulated wires. Moreover, for use under severe conditions, an increase in the reliability of insulated wires is desired, and development of materials having superior chemical resistance, e.g., resistance to alkali, resistance to solvents, or resistance to hydrolysis, is under way. It is noted that of the thermostable insulating materials now available, those having good thermal stability have good chemical resistance.

On the other hand, electrical machinery manufacturers have pushed forward automation and production on an assembly line in order to minimize the cost of production. One such attempt is the removal of insulation on an assembly line. Magnet wires are wound on a motor, transformer, etc. At this time, the insulation coating at the coil ends or lead wires must be removed for soldering. Methods for removal of insulation include (1) mechanical removal (the insulation is cut off mechanically using, for example, a wire brush or a knife), (2) removal by heat decomposition (the insulation is decomposed at high temperatures using a flame, for example), (3) chemical removal (the insulation is decomposed with a chemical such as an alkali) and (4) removal by solder (the insulation is decomposed in a molten solder bath). All of these methods have their own advantages and disadvantages. According to method (1), large quantities of insulation cannot be removed at one time, and also the conductors tend to be damaged. Thus, in the case of thin wires, breakage frequently occurs rendering them unsuitable for use, and this method does not comply with the trend toward attenuation of wires. According to method (2), that part of the insulating material which is near the coil end to be removed tends to be decomposed as well, because of the heat applied. Particularly in the case of thin wires, not only the insulating material but also the conductor is melted resulting in a breakage of the wires or a decrease in the conductor diameter. Thus, this method is not feasible for practical applications, and does not comply with the trend toward attenuation. Method (3) makes it possible to remove a large number of insulations at one time, but, since a certain period of time is required, a problem arises in continuous operation. Moreover, this method is more time-consuming for insulations having good chemical resistance. Method (4) enables a large number of insulations to be removed within a short period of time, and no problem arises even when the removal is conducted on a continuous assembly line. Furthermore, since solder is adhered to the conductors after removal of the insulation, the conductors are easily solderable. When it is desired to solder insulated wires to each other, this method can be advantageously used since by twisting insulated wires having coatings of wire enamel and dipping a strand of the wires, the removal of the insulation and soldering are performed at a time. The removal of the insulation can be simply and precisely performed even with thin wires. However, when the coatings of wire enamel are not decomposable with molten solder, this method is useless.

Of these methods for insulation removal, method (3) (chemical removal) and method (4) (removal with solder) have process advantages in that they permit the processing of a large number of wires at one time and can be automated and performed on an assembly line. Method (4) is considered the most useful because solder adheres to the conductors at the time of the removal of the insulation, and the removal of the insulation and the soldering of the wires can be accomplished at one time. This capability of being removed by solder is called solderability, and is one of the characteristics which electrical machinery manufacturers strongly desire.

As has been stated hereinabove, insulated wires desirably should be not only attenuated and improved in thermal resistance and chemical resistance, but also be processable on an assembly line for the removal of the insulation. However, improvement in thermal resistance and chemical resistance is quite inconsistent with the removability of the insulation on an assembly line. Methods for attaining removability of insulation on an assembly line are method (3) (chemical removal) and method (4) (removal by solder). However, the higher the chemical resistance of the insulation increases, the more stable is the insulation to chemicals, making it difficult to remove the insulation with chemicals. Further, when wires are made thermally resistant, the insulation becomes thermally stable, and cannot be completely decomposed in molten solder, but remain carbonized, in which case the soldering of the wires becomes difficult. With solderable wires, the insulation usually is easily decomposed and separated when the molten solder is at a temperature of about 360° to 400°C, and solder is adhered to the conductors. However, with thermally stable wires, the insulation is not completely decomposed even when the temperature of the molten solder is increased to a temperature as high as 500°C, with the result that the insulation is carbonized and covers the conductors. To decompose the insulation by increasing further the temperature of the molten solder would be not only dangerous, but also cause the copper of the conductors to diffuse into the solder and thus to make the conductors thinner. Consequently, the soldered joint parts of the conductors tend to break, and with thin wires, the conductors would be lost.

The time during which the insulated wires are dipped in a molten solder bath is preferably as short as possible. If this method is carried out for a long period of time, it causes troubles at continuous treatment, and it has a bad influence upon the insulated films near the solder bath by heat conducted through the conductor.

Moreover, the copper of the conductor gradually diffuses in the solder bath and the conductor becomes thin and easily broken. Accordingly, it is more preferable that the temperature of the solder is lower and the period of dipping in the solder is shorter.

In a case of treating thermostable magnet wires having 1 mm of the diameter, it is preferable to carry out at below 450°C for less than 10 seconds and preferably for less than 5 seconds.

Some makers of electric apparatus allow soldering at a high temperature for a long period of time because of the ease of soldering. But the treatment at a high temperature for a long period of time has naturally limitation. For example, in a case of soldering a conductor having 1 mm of the diameter at 480°C, the period of time for soldering is at most 30 seconds. Because, soldering at 480°C is difficult at continuous treatment, if the period of time for treatment is above 30 seconds. Furthermore, heat conducted through the conductor has a bad influence upon the insulated film near the solder bath. Moreover, a most fatal fact is that copper of the conductor diffuses in the solder and the conductor becomes thin and is easily broken. Thus, satisfactory joints can not be obtained.

In thermostable magnet wire known in the present, it is impossible to solder not only at less than 450°C for less than 10 seconds but also at less than 480° for less than 30 seconds.

Such being the case, improvements in thermal resistance and chemical resistance are in direct opposition with the removal of the insulation on an assembly line. Thus, when it is strongly desired to improve the thermal resistance and chemical resistance of insulated wires, the insulation must be removed by a mechanical method or a heat decomposing method, and no attempt to perform this operation on an assembly line would be made. Since mechanical removal of the insulations of thin wires is difficult, it has been necessary to rely on the heat decomposing method in spite of the possible adverse effects on other parts of the wires than the coil ends. Conversely, when it is desired to perform the removal of the insulation on an assembly line, the thermal resistance and chemical resistance of the wires cannot but be sacrificed. In recent years, however, attenuation of wires has been attempted to a greater extent, and because of the demand for automation, there has been a strong desire for thermostable insulated wires having solderability. More recently, as a result of fires in color television sets in U.S.A., fire retardancy of the wires has become increasingly desirable.

Examples of thermostable materials now in widespread use are polyimides, polyamide-imides, and isocyanurated polyester-imides materials. When these materials are used for insulated wires, these materials have superior cut-through resistance, heat resistance and thermal property as well as good fire retardance and chemical resistance. However, these superior properties make the removal of the insulation even more troublesome and time-consuming. When these materials are dipped in chemicals, they are not decomposed within short periods of time, and when immersed in a solder bath at a temperature as high as 500°C, they are carbonized and adhere to the conductors, making it impossible for the solder to adhere to the conductors. This is clearly demonstrated, for example, by Comparative Examples 1, 2, 3 and 5 hereinafter. Accordingly, the removal of insulation can at present be performed only by mechanical cutting of the insulations or burning them away with a flame, and this presents a great setback against the performance of this operation on an assembly line. In addition, as stated previously, the above methods are substantially useless for treating thin wires, and do not comply with the current trend for attenuating insulated wires. Accordingly, these materials are used mainly for wires of medium to large sizes, and only in applications which require sufficient thermal resistance.

One of the insulating materials which have recently come into widespread use is a thermosetting polyester, but this material has low thermal stability and does not exhibit satisfactory fire retardancy which has been of greater concern lately. An attempt to enhance its thermal properties by increasing the amount of cross-linking would improve the thermal properties that are effective for a short period of time (such as cut-through resistance), but contribute only to a limited improvement in the thermal properties that are effective for a long period of time (such as dielectric breakdown after heat degradation) because of its chemical structure. Further, heat shock and plasticity are remarkably deteriorated. This material can be decomposed with an alkali, but those thermosetting polyesters which have been improved in thermal stability take a longer time for decomposition. Generally, polyesters have poor solderability, and even when they are immersed in a solder bath for prolonged periods of time, the carbonized insulation frequently remains attached to the conductors. This will be clear from Comparative Example 4 to be given later on. Accordingly, polyesters are not completely satisfactory insulating materials in applications with require both solderability and thermal stability.

Polyurethanes are well known as insulating materials having solderability, and are popular among the electrical machinery manufacturers because they are solderable at a relatively low temperature of 360° to 400°C and can be easily processed on an assembly line. However, polyurethanes have poor thermal resistance which is classified at best as Class E (a thermal rating according to the criterion given in JIS C-4003 corresponding to IEC Publication 85). Furthermore, since they are combustible, they do not meet the requirements of modern insulated materials. However, polyurethane insulating materials are still popular among manufacturers, because they permit easy insulation removal on an assembly line, and this advantage is especially great with attenuated wires. In other words, polyurethane insulating materials have process advantages and are readily available especially in the case of attenuated wires, and a demand for rendering them thermally stable and fire-retardant has arisen. With other insulating materials, the line of the manufacturing process should be changed. The increase in the number of process steps requires an increase in manpower or equipment. It is for this reason that the change to thermally stable materials has not been made, and even now, polyurethane materials are in widespread use.

Thus, none of the known insulating materials have a combination of solderability, thermal stability and fire retardance, and there has been an increasing demand for these materials in recent years.

On the other hand, requirement for magnet wires becomes severe and complicated more and more recently. For example, since the makers of electric apparatus are going to introduce high speed automatic winding apparatus, it is desired that the wires endure to mechanical stress at automatic winding at a high speed.

Furthermore, in insulated wires used in refrigerant of a refrigerator or a cooler, etc., it is required to have a refrigerant resisting property. In insulated wires used in a steam atmosphere, it is required to have moisture-proofing thermostability. In insulated wires which are subjected to a rapid thermal load, it is required to have heat shock resistance and over load resistance. In insulated wires which contact solvents, it is required to have an anti-crazing property. Of course, thermostability, namely, thermal life is also required. With respect to such many kinds of requirements, polyimide insulated wires and polyamide-imide insulated wires have sufficient thermostability and above-described properties.

However, as being known, the polyimide insulated wires and the polyamide-imide insulated wires are very expensive and have an over quality for the above described requirements. Accordingly, it is not necessary to use the polyimide insulated wires or the polyamide-imide insulated wires.

Recently, insulated wires have been developed which satisfy the above described requirements (they have no over-quality) and are not so expensive. Namely, they are multi-layer wires composed of a combustion of insulating materials which have characteristics of each insulating material.

As the multi-layer magnet wires having good properties and being widely used, there are insulated wires which comprise an insulating layer as an under layer on a conductor and an insulating layer as an over layer thereon, wherein said under insulating layer is formed by applying a polyimide wire enamel or a polyamide-imide wire enamel to the conductor and baking and said over insulating layer is formed by applying another wire enamel (e.g. polyester wire enamel and polyester-imide wire enamel, etc.) and baking, and insulated wires which comprise a polyimide insulating layer or a polyamide-imide insulating layer as an over layer and another insulating layer as an under layer (e.g. polyester insulating layer or polyester-imide insulating layer). These insulated wires have a characteristic that properties of the polyester insulating layer or the polyester-imide insulating layer are compensated by excellent thermal, electric, mechanical and chemical properties of the polyimide insulating layer or the polyamide-imide insulating layer. Further, since a sufficient effect is obtained even if the thickness of the polyimide insulating layer or the polyamide-imide insulating layer is thin, the wires are not so expensive as compared with the polyimide insulated wires or the polyamide-imide insulated wires. The cost thereof is slightly higher than that of the insulated wires composed of only one insulating material (e.g. polyester or polyester-imide). Characteristics of these multi-layer insulated wires are illustrated in the following in greater detail.

The polyimides or the polyamide-imides which are known as thermostable insulating materials are effective in improvement of thermal properties. For example, with respect to the heat shock resistance, though the polyester insulated wires cause cracking at 150°C for 2 hours at 3-fold diameter, insulated wires comprising a polyamide-imide insulating layer or a polyimide insulating layer on a polyester insulating layer do not cause cracking at 180°C for 2 hours at 3-fold diameter. Further, it is observed improved over-load resistance and thermal life in the insulated wires having a multi-layer structure. With respect to the mechanical properties, though a repeated abrasion of the polyester insulated wire is 40 cycles or so, that of the insulated wire having a multi-layer structure comprising a polyamide-imide insulating layer as the over layer is 80 cycles or more. With respect to chemical properties, the polyester is easily hydrolyzed if used in a moisture atmosphere because it has ester bonds, and thus it has an inferior moisture-proofing thermostability. Further, the polyester-imide causes crazing by solvents of varnish if it is brought into contact with the varnish to be dipped.

These faults can be solved by combining the polyimides or the polyamide-imides so as to make a multi-layer structure. Namely, it is possible to remarkably improve the properties by making a multi-layer structure with using the polyimides or the polyamide-imides. Accordingly, recently, these mutli-layer magnet wires have been widely used.

These multi-layer magnet wires however have a fault that it is difficult to carry out removal of insulation because the polyimides or polyamide-imides are used. Namely, chemical removal is substantially impossible to carry out because the polyimides or the polyamide-imide are stable to chemicals. Further, the solder removal method is further impossible to carry out in the case of such multi-layer insulated wires which are combined with thermostable polyimides or polyamide-imides.

Accordingly, it has been required a method of removal of the insulation which can be carried out easily and continuously for treating the multi-layer insulated wires which are composed of a combination of a polyimide insulating material or a polyamide-imide insulating material and another insulating material (e.g. polyester or polyester-imide, etc.) in the view point of properties and cost.

As the result of many studies for satisfying these desires, the present inventors have found the insulated wires having a multi-layer structure composed of a polyimide insulating material or a polyamide-imide insulating material which has solderability, good thermostability and noninflammability.

SUMMARY OF THE INVENTION

The present invention relates to solderable and thermostable insulated wires which comprise an insulating layer as an under layer which is formed by applying a polyester-imide wire enamel (which include polyester-imide or polyesteramide-imide, and has 5-membered imide rings and ester bonds in the molecule) to a conductor and baking, wherein said polyester-imide wire enamel comprises the reaction product of (A) a dibasic carboxylic acid free of 5-membered imide ring, a derivative thereof or a mixture thereof, (B) a dibasic carboxylic acid which has at least one 5-membered imide ring, a derivative thereof or a mixture thereof, (C) a tri- and/or more-hydric aliphatic alcohol and (D) a dihydric alcohol, and an insulating layer as an over layer which is formed by applying a polyimide wire enamel or a polyamide-imide wire enamel to said under layer and baking.

BRIEF DESCRIPTION OF THE ACCOMPANYING DRAWING

The FIGURE shows the equivalent proportions of the components (A), (B), (C) and (D). The area defined by E-F-G-H-E of the drawing is the preferred range and the area defined by I-J-K-L-I is the most preferred range specified and claimed in the present invention.

DETAILED DESCRIPTION OF THE INVENTION

The present invention will be illustrated in greater detail in the following. Since the insulated wires prepared by the present invention have a multi-layer structure composed of a combination of a polyester-imide insulating material and a polyimide insulating material or polyamide-imide insulating material, they have excellent thermal, mechanical, electric and chemical properties as well as excellent solderability. The polyester-imide, of course, is a thermostable material belonging to Class F and has noninflammabililty. As desired above, it has been believed that the solderability is incompatible with the thermostability because these properties are quite opposite each other. Accordingly, it has been supposed that it is of course impossible to carry out soldering the polyester-imide wires (Class F) which have higher thermostability than that of thermosetting polyester wires (Class B) which can not be soldered. Of course, it is beyond conception to give the solderability.

Moreover, in the multi-layer insulated wires composed of polyimides or polyamide-imides having higher thermostability than that of polyester-imides, it is not thinkable to give the solderability because of their excellent thermostability. Of course, there is no multi-layer insulated wire having excellent thermostability which can be soldered. Accordingly, in such multi-layer insulated wires, improvement of the solderability has not be attempted and methods for continuously treating the removal of the insulation have only been studied. Thus, there are many studies about the methods of removal of the insulation. For example, removing agents for decomposing the insulating films have been examined. However, since the polyimides or polyamide-imides are stable to chemicals, preferable removing agents have not been found. If such removing agents are developed, handling thereof is attended with danger and the conductor suffers from chemical changes. Furthermore, an attempt of fusing has been done with a view to causing heat decomposition of the insulating films at a high temperature. However, this method is not only dangerous but also has a bad influence upon the insulating layers.

However, the present inventors have found out a reasonable method of removal of the insulation for the insulated wires having a multi-layer structure composed of a combination of a polyester-imide insulating material and a polyimide insulating material or a polyamide-imide insulating material (namely, a method for giving solderability) which has been believed to be impossible and has been previously disregarded.

In the insulated wires produced by the method of the present invention, properties thereof are improved since the characteristic of the polyester imide insulating material of the insulating layer as the under layer is effectively utilized by means of the polyimide or polyamide-imide insulating material of the insulating layer as the over layer, and defects of the polyester-imide insulating material are removed. That is, the insulated wires produced by the present invention have excellent thermal properties (heat deterioration life, over-load resistance, heat shock resistance and cut through resistance, etc.), excellent mechanical properties (abrasion resistance and windability, etc.), excellent chemical properties (alkali resistance, anti-crazing property, refrigerant resisting property and moisture-proofing thermostability, etc.) and excellent electric properties while having noninflammability. Especially, the poor anti-crazing property which is a defect of the polyester-imide insulating materials is effectively improved. Further, the windability is remarkably improved. A characteristic of the present invention is to give solderability while keeping the above described excellent properties.

In the present invention, the solderability is given by the polyester-imide insulating layer. Moreover, the soldering can be carried out in only the case that the polyester-imide insulating layer is existent as the under layer.

In the multi-layer insulated wires, materials of the over layer and under layer are decided according to characteristics to be desired. But in many cases, the material for the over layer can be used as the material for the under layer, while the material for the under layer is used as the material for the over layer. However, in the present invention, the polyester-imide insulating layer is utilized as the under layer and the polyimide or polyamide-imide insulating layer is used as the over layer. In the reverse case, namely, in the case that the polyimide or polyamide-imide insulating layer is used as the under layer and the polyester-imide insulating layer is used as the over layer, the solderability is lost though another properties do not deteriorate. This is because the solderability depends upon a kind of insulating material on the interface contacting with the conductor. By forming the solderable polyester-imide insulating layer as the under layer, it becomes possible to carry out soldering even if the nonsolderable polyimide or polyamide-imide insulating layer is existent as the over layer, because the under layer is decomposed and removed from the conductor at soldering and thus the over layer is also removed.

In the reverse case, though the solderable polyester-imide insulating layer as the over layer is decomposed and removed at soldering, the nonsolderable polyimide or polyamide-imide insulating layer as the under layer does not decompose or is carbonized, if decomposed. Thus it is impossible to carry out soldering, because the nondecomposed layer or carbonized materials adhere to the conductor and can not be removed therefrom.

Of course, the solderable and thermostable insulated wires can be produced in a scope of the present invention. That is, the solderable and thermostable insulated wires can be produced by applying a polyester-imide wire enamel mainly comprising the reaction product of components (A), (B), (C) and (D) to a conductor and baking to form an insulating layer as an under layer, and applying a polyimide or polyamide-imide wire enamel thereto and baking to form an insulating layer as an over layer. However, a further preferable range can be selected within the scope of the present invention so as to satisfy many characteristics of magnet wires.

Namely, it is preferred to use polyester-imide wire enamels which mainly comprise the reaction product of components (A), (B), (C) and (D) in the equivalent proportions of components (A), (B) and (C) that (A) is 5 to 55 equivalent %, (B) is 10 to 60 equivalent %, (C) is 35 to 55 equivalent % in order to produce the under insulating layer as shown in Figure as the area of E-F-G-H-E.

If the proportion of the component (A) is less than 5 equivalent %, there are troubles in synthesis of the wire enamel and in the production of insulated wires. If the proportion of the component (B) is less than 10 equivalent %, the heat shock property becomes inferior. If the proportion of the component (C) is less than 35 equivalent %, the cut through resistance becomes inferior. When the proportion of the component (C) exceeds 55 equivalent %, the flexibility is somewhat deteriorated.

These disadvantages are removed in the above described range that (A) is 5 to 55 equivalent %, (B) is 10 to 60 equivalent % and (C) is 35 to 55 equivalent %. In recent years, many kinds of property are required on the magnet wires. This tendency will continue in the future.

This fact is true in the solderable and thermostable insulated wires of the present invention. For example, in the view point of the thermostability, it is supposed to be sufficient if the soldering can be carried out within 30 seconds at 480°C in the case of a wire having 1 mm of the diameter, because there is no solderable and thermostable wire. But a requirement for shortening the period of time as short as possible and a requirement for decreasing the temperature as low as possible will soon appear in the field of electric apparatus. Further, with respect to the heat shock property, it is usually sufficient if 3-fold diameter is good at 200°C for 2 hours, since the magnet wires are not wound on articles having so small diameter and the temperature in the apparatus is not so high. Nevertheless better reliance will be required.

Furthermore, with respect to the heat resisting life, it is desired to sufficiently satisfy conditions of Class F without feeling any anxiety. The same matter will be found on another properties.

The most preferable range is as follows, at which many properties and requisites required for magnet wires, such as better solderability, better thermostability and lost cost, are sufficiently satisfied.

That is, it is most preferable that the polyester-imide wire enamel used for forming the under insulating layer mainly comprises the reaction product of components (A), (B), (C) and (D) in the equivalent proportions of components (A), (B) and (C) that (A) is 10 to 40 equivalent %, (B) is 20 to 50 equivalent % and (C) is 40 to 55 equivalent % as shown in the Figure as the area of I-J-K-L-I.

If the proportion of the component (A) is less than 10 equivalent %, the component (B) is used of course in a larger amount. Consequently the cost becomes high because the component (B) is expensive, and the resulting product is lacking in flexibility.

If the proportion of the component (B) is less than 20 equivalent %, it cannot be expected to obtain good heat shock property or good solderability. Namely, though it is possible to have good 3-time diameter property at 200°C for 2 hours, it is not possible to obtain good 1 time diameter property at 200°C for 2 hours. Further, though the soldering can be carried out at 480°C within 30 seconds in the case of a conductor having 1 mm of the diameter, it can not be carried out at 450°C within 10 seconds.

When the proportion of the component (C) is less than 40 equivalent %, there is a disadvantage of dielectric breakdown after heat aging. When the proportion of the component (C) exceeds 55 equivalent %, the resulting product is lacking in plasticity.

Accordingly, the most preferable range is above described range, that is, an equivalent ratio of (A), (B) and (C) is (A) 10 to 40 equivalent %: (B) 20 to 50 equivalent % : (C) 20 to 50 equivalent %.

The polyester-imide insulating layer as the under insulating layer used in the present invention can be formed by a polyester-imide wire enamel (which includes polyester-imide or polyesteramide-imide, and has 5-membered imide rings and ester bonds in the molecule) to a conductor and baking, wherein said polyester-imide wire enamel mainly comprises the reaction product of (A) a dibasic carboxylic acid free of a 5-membered imide ring, a derivative thereof or a mixture thereof, (B) a dibasic carboxylic acid which has at least one 5-membered imide ring, a derivative thereof or a mixture thereof, (C) a tri- and/or more-hydric aliphatic alcohol and (D) a dihydric alcohol.

In the following, the polyester-imide wire enamel used in the present invention will be illustrated.

The components (A), (B), (C) and (D) do not necessarily represent the starting materials per se used in producing the intended insulation coating. These components represent the essential nature of the starting materials as constituents that exert effects on the characteristics of the insulated wire. Accordingly, the components (A) and (B) are characterized as carboxylic acids or their derivatives or mixtures thereof, and the components (C) and (D) are characterized as alcohols. However, various cases are involved in using a reaction product of these, for example, using the reaction product of each, using a product obtained by decomposing this reaction product, using materials before forming the reaction product, or using a precursor thereof. It goes without saying that these components should be (A), (B), (C) and (D) as the basic components which affect the properties of the insulation coating obtained by applying the resulting wire enamel to a conductor and baking the coating thereon.

With respect to component (A), which is a divalent carboxylic acid not containing a 5-membered imide ring or its derivative or its mixture, the divalent carboxylic acid can be aromatic, alicyclic or aliphatic dicarboxylic acids, with the aromatic dicarboxylic acids being preferred. The dicarboxylic acids are expressed by the general formula HOOC — R — COOH in which R is a divalent group containing at least two carbon atoms. Examples of aromatic dicarboxylic acids are isophthalic acid, terephthalic acid, 1,2-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, diphenyl-2,2'-dicarboxylic acid, diphenyl-2,3'-dicarboxylic acid, diphenyl-2,4'-dicarboxylic acid, diphenyl-3,3'-dicarboxylic acid, diphenyl-4,4'-dicarboxylic acid, diphenylmethane-2,2'-dicarboxylic acid, diphenylmethane-4,4'-dicarboxylic acid, diphenylethane-4,4'-dicarboxylic acid, diphenylsulfone-4,4'-dicarboxylic acid, benzophenone-4,4'-dicarboxylic acid, and diphenyl-2,2-propane-4,4'-dicarboxylic acid.

The dicarboxylic acids which are suitable also include those expressed by the general formula

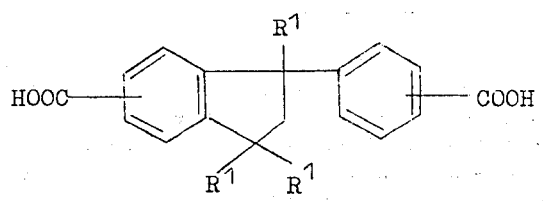

wherein $R^1$ is a hydrogen atom or an alkyl group containing 1 to 3 carbon atoms.

Examples of aliphatic dicarboxylic acids are adipic acid, succinic acid, maleic acid, sebacic acid, isosebacic acid, and dimeric acid.

Alicyclic dicarboxylic acids of the general formula

in which

is a cyclohexyl group or

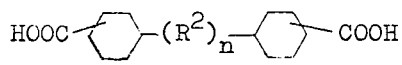

in which

is a cyclohexyl group, R² is —O—,

—CH₂—, —(CH₂)₂—, —C(CH₃)₂—, —SO₂—, Si(CH₃)₂, or —P(CH₃)—, and n
$$\qquad\qquad\qquad\qquad\qquad\qquad\qquad\qquad\;\;\overset{\parallel}{O}$$

and n is a positive integer can also be used. Examples of these dicarboxylic acids are hexahydroisophthalic acid (cis- and trans- or a mixture of these), hexahydroterephthalic acid (cis- and trans- or a mixture of these), and bicyclo 2,2,2 octane-1,4-dicarboxylic acid.

The derivative can be an ester, such as a lower dialkyl ester of the above carboxylic acid, for example, dimethyl terephthalate, diethyl terephthalate, dipropyl terephthalate, dibutyl terephthalate, diamyl terephthalate, dihexyl terephthalate, or dioctyl terephthalate when the carboxylic acid is terephthalic acid. A half ester of such a carboxylic acid such as monomethyl terephthalate is also suitable. Other derivatives include the dihalides of the above carboxylic acids, such as the carboxylic acid dichlorides, and the acid anhydrides of these carboxylic acids, such as phthalic anhydride. These carboxylic acids and their derivatives can be used either alone or as a mixture.

Terephthalic acid, isophthalic acid, or their derivatives, or those derived by replacing a portion of these by another carboxylic acid or its derivative are especially preferred as component (A).

As long as the effects of the present invention are not reduced, component (A) can be replaced in part by a polyvalent carboxylic acid which is trivalent or higher or its derivative. Examples of such a polyvalent carboxylic acid or its derivative are trimellitic acid, trimellitic anhydride, hemimellitic acid, hemimellitic anhydride, trimesic acid, and trimesic anhydride.

The component (B) in this invention is a divalent carboxylic acid containing at least one 5-membered imide ring or its mixture, but so long as the effects of the present invention are not reduced, a portion of component (B) can be replaced by a polyvalent carboxylic acid containing at least one 5-membered imide ring which is trivalent or higher, or its derivative or its mixture. The divalent or higher carboxylic acid containing at least one 5-membered imide ring is obtained by reacting a compound (1) below with a compound (2) below, or by reacting a compound (1) below with a compound (3) below.

1. An aromatic carboxylic anhydride containing a five-membered ring carboxylic anhydride group and at least one reactive group. The reactive group can be a carboxyl group or a carboxylic anhydride group. Instead of the cyclic carboxylic anhydride group, two carboxyl groups bonded to the adjacent carbon atoms or esters thereof or half esters thereof, or as long as an imide group can be formed, the half amides with a primary amine described in (2) below, can also be used.

2. A primary amine containing a primary amino group and at least one other reactive group. The reactive group can be a carboxyl group or a primary amino group. Instead of the primary amine, a salt of the amine, an amide, a lactam or a polyamide can be used so long as the primary amino group bonded can contribute to the formation of an imide.

3. A polyisocyanate compound.

Examples of the compound (1), which contains a cyclic carboxylic anhydride group and another functional group, are tricarboxylic acid anhydrides such as trimellitic anhydride, hemimellitic anhydride, 1,2,5-naphthalenetricarboxylic anhydride, 2,3,6-naphthalenetricarboxylic anhydride, 1,8,4-naphthalenetricarboxylic anhydride, 3,4,4'-diphenyltricarboxylic anhydride, 3,4,4'-diphenylmethanetricarboxylic anhydride, 3,4,4'-diphenylethertricarboxylic anhydride, or 3,4,4'-benzophenonetricarboxylic anhydride, and tetracarboxylic dianhydrides such as pyromellitic dianhydride, 2,3,6,7-naphthalenetetracarboxylic dianhydride, 1,8,4,5-naphthalenetetracarboxylic dianhydride, 1,2,5,6-naphthalenetetracarboxylic dianhydride, 3,3'-4,4'-diphenyltetracarboxylic dianhydride, 2,2',3,3'-diphenyltetracarboxylic dianhydride, 3,3',4,4'-diphenylethertetracarboxylic dianhydride, 3,3',4,4'-diphenylmethanetetracarboxylic dianhydride, or 3,3',4,4'-benzophenonetetracarboxylic dianhydride. Trimellitic anhydride is especially preferred.

Examples of the compound (2) which contains a primary amino group and other functional groups are primary diamines such as 4,4'-diaminodiphenyl methane, 4,4'-diaminodiphenyl ether, benzidine, 3,3'-diaminodiphenyl, 1,4-diaminonaphthalene, m-phenylene diamine, p-phenylene diamine, α,ω-nonamethylene diamine, 1,7-dimethylheptamethylene diamine, 4,4'-diaminodiphenyl ketone, bis-(4-aminophenyl)-α,α'-p-xylene, tolylene diamine, xylylene diamine, hexamethylene diamine, ethylene diamine, 4,4'-dicyclohexylmethane diamine, or diaminodiphenyl sulfone benzoguanamine(containing an amide bond in the molecule and preferably being an aromatic diamine); and aminocarboxylic acids such as glycocoll (glycine), aminopropionic acid, aminocaproic acid, or aminobenzoic acid.

Examples of the polyisocyanate compound (3) are mononuclear polyisocyanates such as m-phenylene diisocyanate, 2,4 tolylene diisocyanate or 2,6-tolylene diisocyanate; aromatic polyisocyanates having a number of rings or a fused ring, such as diphenyl ether-4,4'-diisocyanate, diphenylmethane-4,4'-diisocyanate, diphenylmethane-2,4'-diisocyanate, diphenylmethane-2,2'-diisocyanate, diphenylsulfone-4,4'-diisocyanate, diphenylthioether-4,4'-diisocyanate, or naphthalenediisocyanate; polymethylene polyphenylene polyisocyanate, hexamethylene diisocyanate, or xylylene diisocyanate; and blocked isocyanates obtained by stabilizing the isocyanate groups of these polyisocyanates with, for example, a phenolic hydroxyl group.

The most preferred divalent carboxylic acids containing 5-membered imide rings are those of the formula

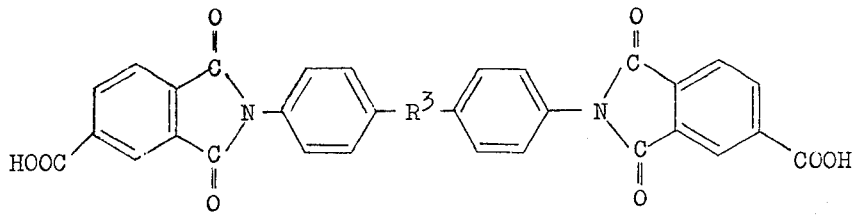

wherein $R^3$ is —$CH_2$—, —O— or —$SO_2$—,
which are obtained from 2 mols of trimellitic anhydride and 1 mol of either 4,4'-diaminodiphenyl methane, 4,4'-diaminodiphenyl ether, diphenylmethane-4,4'-diisocyanate, diphenylether-4,4'-diisocyanate or diphenylsulfone-4,4'-diisocyanate.

Also, those of the following formula

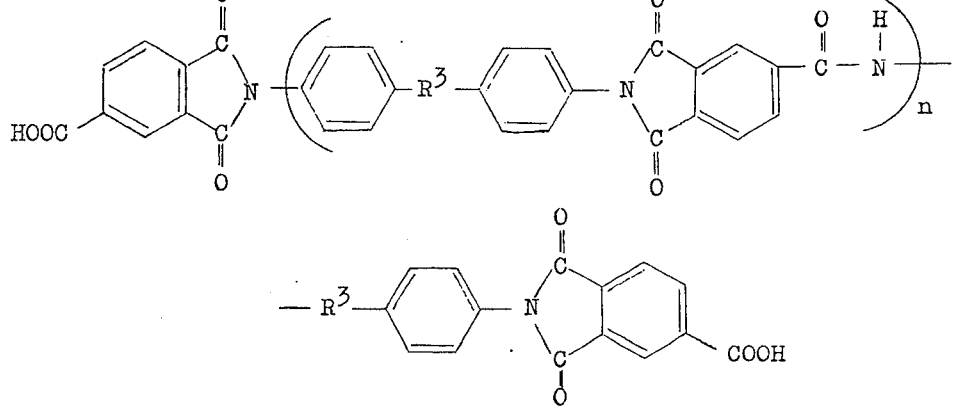

wherein R is —$CH_2$—, —O— or —$SO_2$—, and $n$ is preferably above 0 but not more than 4 on the average,
which are obtained from 2 mols of trimellitic anhydride and 1 to 2 mols of either 4,4'-diaminodiphenylmethane, 4,4'-diaminodiphenyl ether, diphenylmethane-4,4'-diisocyanate, diphenylether-4,4'-diisocyanate, or diphenylsulfone-4,4'-diisocyanate can be used. In (1) above, a part of the aromatic carboxylic anhydride can be replaced by a dicarboxylic acid to form an amide bond. Furthermore, it is possible to react 1 mol of a dicarboxylic acid or its derivative (e.g., the acid halide) with 0.5 to 1 mol of a diamine to form a diamine having a terminal amino group and use the product as (2). Alternatively, it is possible to use a diamine having an amide group in the molecule as (2). The dicarboxylic acid, referred to herein, is, for example, terephthalic acid, isophthalic acid, a phenylindanedicarboxylic acid of the general formula

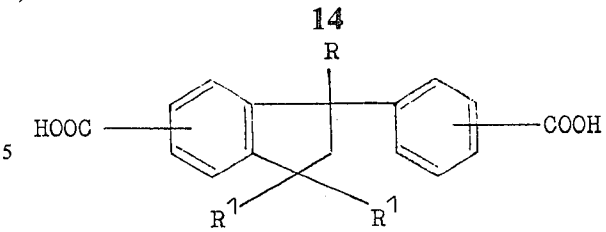

wherein $R^1$ is a hydrogen atom or an alkyl group containing 1 to 3 carbon atoms,
such as 3-(4-carboxyphenyl)-5-indanecarboxylic acid, 3-(3-carboxyphenyl)-5-indanecarboxylic acid, 3-(3-carboxyphenyl)-1,1,3-triethyl-6-indanecarboxylic acid, 3-(4-carboxyphenyl)-1-methyl-1,3-dipropyl-5-indanecarboxylic acid, or 3-(4-carboxyphenyl)-1-methyl-1,3-diethyl-6-indanecarboxlic acid, phthalic acid, phthalic anhydride, hexahydroterephthalic acid, hexahydroisophthalic acid, adipic acid, succinic acid, maleic acid, sebacic acid, isosebacic acid, dimeric acid, tetrachlorophthalic acid, hexachloroendomethylene tetrahydrophthalic acid, 4,4'-dicarboxy-diphenylmethane, 4,4'-dicarboxy-diphenylpropane, and benzophenonedicarboxylic acid. The derivative thereof can be the acid dihalides of these dicarboxylic acids, such as the acid dichloride.

These polycarboxylic acids containing at least one 5-membered imide ring can be obtained by reacting the compounds (1) with the compounds (2) or reacting the compounds (1) with the compounds (3) in the presence or absence of a solvent. In the reaction of the compounds (1) with the compounds (3), a small amount of a solvent as exemplified below is used and if desired, a small amount of an isocyanate activating catalyst is added; and the reaction is performed substantially in the molten or solid state although it can be effected in a solvent, thereby to form the polycarboxylic acids containing at least one 5-membered imide ring.

The solvent that can be used for preparing the above polycarboxylic acid containing at least one 5-membered imide ring can, for example, be N-methyl-2-pyrrolidone, N,N-dimethylacetamide, N,N-dimethylformamide, N,N-diethylformamide, N,N-diethylacetamide, dimethyl sulfoxide, N-methylcaprolactam, cresolic acid, phenol, o-cresol, m-cresol, p-cresol, 2,3-xylenol, 2,5-xylenol, 2,6-xylenol, 3,4-xylenol, or 3,5-xylenol. Aliphatic hydrocarbons, aromatic hydrocarbons, halogenated hydrocarbons, ethers, ketones, and esters can also be used; specific examples of these include benzene, toluene, xylene, ethylbenzene, diethylbenzene, isopropylbenzene, petroleum naphtha, coal tar naphtha, solvent napphtha, acetone, methyl ethyl ketone, methyl isobutyl ketone, methyl acetate, and ethyl acetate.

These solvents can be used either alone or as a mixture.

The derivatives of the above polycarboxylic acids containing at least one 5-membered more than one ring are, for example, their esters or acid halide. As component (B) not only one of the above-exemplified polycarboxylic acids or the derivatives thereof, but also a mixture of these can be used.

The aliphatic polyhydric alcohol which is trihydric or higher used as the component (C) is an alcohol having neither an aromatic nor a heterocyclic ring at any position of the molecule. Examples of such polyhydric alcohols are glycerol, pentaerythritol, 1,1,1-trimethylolethane, 1,1,1-trimethylol propane sorbitol, mannitol, dipentaerythritol, diglycerol, and 1,2,6-hexanetriol.

As long as the effects of the present invention are not reduced, a portion of the aliphatic polyhydric alcohol as component (C) can be replaced by an alcohol containing an aromatic ring or heterocyclic ring which is trihydric or higher. Examples of these other alcohols are tris-(β-hydroxyethyl) isocyanurate, and tris-(β-hydroxypropyl) isocyanurate. However, since this aromatic or heterocyclic polyhydric alcohol remarkably reduces the solderability of the insulated wire, it is not so preferable to replace a portion of the component (C) by it. Even if this replacement is to be made, only a small portion of the component (C) should be replaced, and it is preferred that the component (C) be composed substantially solely of the aliphatic polyhydric alcohol described above.

Examples of suitable dihydric alcohols as component (D) are ethylene glycol, diethylene glycol, triethylene glycol, 1,2-propylene glycol, 1,3-propanediol, butanediol-1,3 or 1,4, pentanediol-1,5, hexanediol-1,6, butene-2-diol-1,4, or 2,2-dimethylpropanediol-1,3-2-ethyl-2-butyl-propanediol-1,8, 1,4-dimethylolcyclohexane, butenediol-1,4, hydrogenated bisphenols (for example, hydrogenated p,p'-dihydroxydiphenylpropane or its homologs), cyclic glycols such as 2,2,4,4-tetramethyl-1,3-cyclobutanediol, hydroquinone-di-β-hydroxyethyl-ether, 1,4-cyclohexanedimethanol, 1,4-cyclohexane diethanol diethylene glycol, triethylene glycol, tetraethylene glycol, dipropylene glycol, trimethylene glycol, hexylene glycol, or octylene glycol.

As previously described, these components (A), (B), (C) and (D) are the most basic forms of the starting materials as constituents that affect the characteristics of the insulating wire. Accordingly, in the manufacture of wire enamels, the materials can be used in various forms, such as in the form of the reaction products thereof, products obtained by the decomposition of the reaction products, the starting materials before the formation of such reaction products, or precursors of such.

Some examples will be given hereinafter as to the form of the starting materials.

One example of using a reaction product is to use a reaction product between the components (A) and (D), such as bis-(hydroxyethyl) isophthalate or bis-(hydroxyethyl) terephthalate. The bis-(hydroxyethyl) terephthalate is sometimes used as a material for the production of a wire enamel. However, in the present invention, this is considered by all means to be composed of the components (A) and (D), and not only as the dihydric alcohol (D). In this case, the component (A) is, for example, terephthalic acid, and the component (D) is ethylene glycol.

It is also possible to use a compound of the following formula

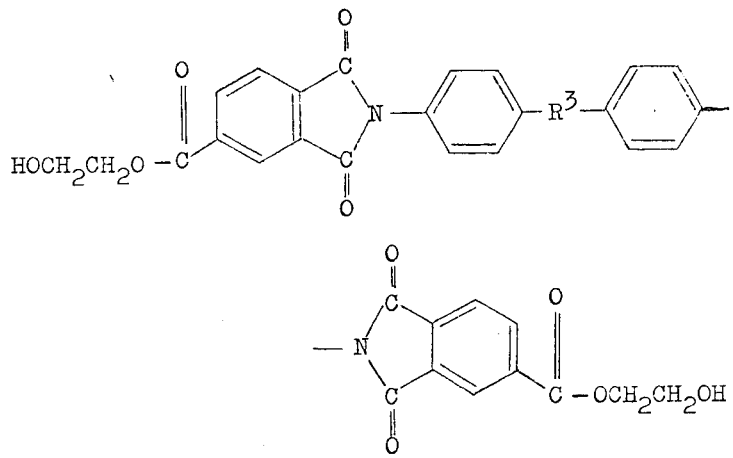

wherein $R^3$ is —$CH_2$—, —O— or —$SO_2$—,
which is a reaction product between the components (B) and (D). Like the first example set forth, this is also a dihydric alcohol when its structure is considered. But in the present invention, that is considered to be composed of components (B) and (D), and not as the dihydric alcohol (D) only. In this case, the component (B) is expressed, for example, by the following general formula

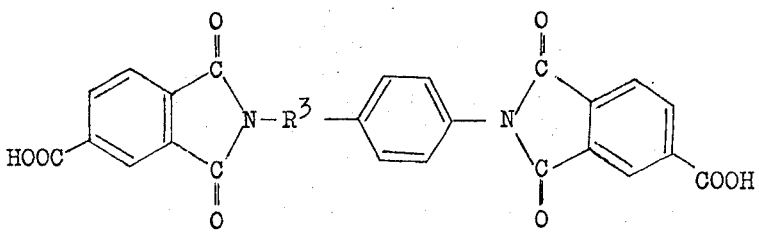

and the component (D) is ethylene glycol.

As the case of using the decomposed reaction product, the use of product obtained by decomposing a reaction product between (A) and (D) is exemplary. A high-molecular-weight linear polyester or a decomposition product thereof can also be used. The high-molecular-weight straight-chain polyester is, for example, polyethylene terephthalate, polyethylene isophthalate, polyethylene isophthalate-terephthalate coester, polytetramethylene isophthalate, polytetramethylene terephthalate, polyethylene adipate, poly(1,4-cyclohexanedicarbinyl terephthalate), poly(1,4-cyclohexanedicarbinyl isophthalate), or polyethylene terephthalate-phenylindanedicarboxylate coester. These linear polyesters are produced on a large commercial scale as resins for fabricating fibers or films, and are readily available. The wastes which occur during the manufacture or processing of these polyesters can also be used. The use of such a material is very effective and advantageous from a commercial stand point.

In this case also, the material used is considered to be composed of the components (A) and (D). For example, even when both end groups of the polyethylene terephthalate are hydroxyl groups, it is not considered to be a dihydric alcohol (D) only, but to be composed of the components (A) and (D). In this case, the component (A) is, for example, terephthalic acid, and the component (D) is ethylene glycol.

As an example of using the materials before the formation of the components (A), (B), (C) and (D), there is a case of using the compounds (1) and (2) or (1) or (3) in a solvent or in the absence of a solvent, as described above with respect to the component (B) which is a polycarboxylic acid containing at least one 5-membered imide can be used as such. These materials may be used in the form that exists before the formation of a 5-membered imide ring by reacting the compounds (1) and (2), that is in the form of amido acid as a precursor.

Thus, each of the components can be used in various forms, and one or more than one compounds in admixture can be used as each of these components. The reaction sequence employed is also optional.

The resin obtained by reacting the components (A), (B), (C) and (D) is dissolved in a solvent to form wire enamel. Examples of suitable solvents are solvents containing a phenolic hydroxyl group such as phenol, o-cresol, m-cresol, p-cresol, o-ethylphenol, m-ethylphenol, p-ethylphenol, 2,3-xylenol, 2,4-xylenol, 2,5-xylenol, 2,6-xylenol, 3,4-xylenol, 3,5-xylenol, o-n-propylphenol, 2,4,6-trimethylphenol, 2,3,5-trimethylphenol, 2,4,5-trimethylphenol, 4-ethyl-2-methylphenol, 5-ethyl-2-methylphenol, and cresolic acid; and polar solvents such as N,N-dimethylacetamide or N-methyl-2-pyrrolidone. As a diluent, an aliphatic hydrocarbon, aromatic hydrocarbon, halogenated hydrocarbon, ether, acetal, ketone or ester can be used. Examples of aliphatic hydrocarbons and aromatic hydrocarbons are n-heptane, n-octane, cyclohexane, decalin, dipentene, pinen, p-menthane, decane, dodecane, tetradecane, benzene, toluene, xylene, ethylbenzene, diethylbenzene, isopropylbenzene, amylbenzene, p-cymene, tetralin, mixtures of these, petroleum naphtha, coal tar naphtha, and solvent naphtha.

The wire enamel so obtained is coated on a conductor and baked to produce an insulated wire. At this time, the use of a small amount of a metal drying agent is useful. Such a metal drying agent can be, for example, an octoate, naphthenate, resinate, or linolate of zinc, calcium, lead or cadmium. Specific examples include zinc octoate, cadmium octoate, cadmium naphthenate, calcium naphthenate, zinc naphthenate, lead naphthenate, lead linolate, calcium linolate, cadmium resinate, and zinc resinate. Manganese naphthenate and cobalt naphthenate are also useful. Instead of, or in conjunction with, the above described metal dryer, a tetraalkyl titanate or its derivative (a tetraalkyl titanium chelate or tetraalkyl titanium acylate) can effectively be used.

Typical examples of tetraalkyl titanates are tetraisopropyl titanate, tetrabutyl titanate, tetrahexyl titanate, tetramethyl titanate, tetrapropyl titanate, and tetraoctyl titanate. Examples of tetraalkyl titanium chelates are the products obtained by reacting tetraalkyl titanates with octylene glycol, triethanolamine or an acetoacetic acid ester. The tetraalkyl titanium acylate can, for example, be a reaction product formed between a tetraalkyl titanate with stearic acid.

A polyisocyanate or an isocyanate regenerated product obtained by blocking the isocyanate group of the polyisocyanate with phenol, cresol, etc. can be used as a curing agent or cross-linking agent. Examples of the curing agent are 4,4',4''-triphenylmethane triisocyanate (Desmodur R trade name of Bayer AG), a cyclic trimer of 2,6-tolylene diisocyanate, a trimer of 4,4'-diphenylmethane diisocyanate, a reaction product obtained from 3 mols of 2,4-tolylenediisocyanate and 1 mol of trimethylol propane, a reaction product formed from 3 mols of 2,6-tolylene diisocyanate and 1 mol of trimethylol propane, a reaction product formed from 3 mols of 2,4-tolylene diisocyanate and 1 mol of trimethylol ethane, and the products obtained by blocking the isocyanate group of these isocyanates with phenol or cresol, etc.

So long as the effects of the present invention are not reduced, a polyamide resin, a phenol resin, a melamine-formaldehyde resin, an epoxy resin, a urea resin or a silicone resin can be used in conjunction with the above described titanium compound or polyisocyanate (or its derivative).

The polyimide wire enamels (which include imidazopyrrolone) in the present invention means those containing polyimide resins (which include imidazopyrrolone) or polyimide precursor resins (which include imidazopyrrolone) as main components. A part of these resins may be modified by resins commonly used in wire enamels such as epoxy resins, phenol resins, polyisocyanates or stabilized polyisocyanates. Processes for producing the polyimide resins (including imidazopyrrolone), solutions thereof, polyimide precursor resins (including imidazopyrrolone) and solutions thereof have been described in U.S. Pat. Nos. 3,377,043 and 3,666,709.

An example of a typical process comprises reacting at least one tetracarboxylic dianhydride with at least one polyamine. Examples of the tetracarboxylic acid dianhydride used include pyromellitic acid anhydride and benzophenone tetracarboxylic acid dianhydride. As the polyamines, diamines, triamines and tetramines are mainly used. Preferably triamines are those wherein two amino groups are in an ortho position each other. Examples of the diamines include 4,4'-diaminodiphenyl ether and 4,4'-diaminodiphenylmethane. Examples of the triamines include 3,4,4'-triaminodiphenyl ether and 3-amino-benzidine. Examples of the tetramines include 3,3'4,4'-tetra-aminodiphenyl ether and 3,3'-diaminobenzidine.

The polyamide-imide wire enamels in the present invention mean those which contain polyamide-imide resins or polyamide-imide precursor resins as main components. A part of these resins may be substituted by resins commonly used in wire enamels such as epoxy resins, phenol resins, polyisocyanates or stabilized polyisocyanates. Processes for producing the polyamide-imide resins, solutions thereof, polyamide-imide precursor resins and solutions thereof have been described in U.S. Pat. Nos. 3,355,427, 3,448,068, 3,562,217 and 3,518,230. An example of a typical process comprises reacting at least one acid chloride of tricarboxylic anhydride with at least one diamine. A part of the acid chloride of tricarboxylic acid anhydride may be substituted by at least one dicarboxylic dichloride, at least one tetracarboxylic acid dianhydride or at least one dicarboxylic acid dichloride and at least one tetracarboxylic acid dianhydride. A part of the above diamine may also be substituted by at least one triamine or at least one tetramine. An example of acid chloride of tricarboxylic acid anhydride is tetrachloride of trimellitic acid anhydride. Examples of the dichloride of dicarboxylic acid include terephthalic acid dichloride, isophthalic acid dichloride and adipic acid dichloride. Examples of diamines include 4,4'-diaminodiphenylmethane, 4,4'-diaminodiphenyl ether and m-phenylene-amine. An example of the triamine is 3,4,4'-triaminodiphenyl ether. An example of the tetramine is 3,3',4,4'-tetraaminodiphenyl ether.

Another example of the typical process comprises reacting at least one tricarboxylic acid anhydride with at least one diisocyanate. In this case, a part of the tricarboxylic acid anhydride may be substituted by at least one dicarboxylic acid, at least one tetracarboxylic acid dihydride, or at least one dicarboxylic acid and at least one tetracarboxylic acid dianhydride. Further, a part of the diisocyanate may be substituted by at least one tri or more valent polyisocyanate. An example of the tricarboxylic acid anhydride is trimellitic acid anhydride. Examples of the dicarboxylic acids include isophthalic acid, terephthalic acid and adipic acid. Examples of the tetracarboxylic acid dianhydride include pyromellitic acid dianhydride and benzophenone tetracarboxylic acid dianhydride. Examples of the diisocyanates include diphenylmethane-4,4'-diisocyanate, diphenyl ether-4,4'-diisocyanate, tolylenediisocyanate, xylylenediisocyanate andd hexamethylenediisocyanate. An example of the polyisocyanate is polymethylenepolyphenylenepolyisocyanate.

Silicones, fluoride type surface active agents and lower molecular polyethylene, etc. may be preferably added to the polyimide wire enamels or the polyamide-imide wire enamels used for forming the over insulating layer. By addition of these materials, windability can be improved because friction factor of the insulated wires decrease.

It is preferred to produce self-binding magnet wires by forming a self-binding layer on the insulated wires of the present invention. The magnet wires are fixed by impregnating with a varnish so as not to release after winding. However, the impregnation treatment requires much time and labor and has a bad smell caused by solvents of the varnish. Therefore, in recent, self-binding magnet wires have been developed. The self-binding magnet wires are binded by heating after winding by which each wire does not release. Consequently, there is no trouble and no bad smell because the impregnating treatment is not necessary.

Accordingly, by forming a self-binding layer on the insulated wires of the present invention, thermostable insulated wires which are not requires impregnating treatment at use and are easily carried out the removal of insulation can be produced. Examples of self-binding layers include those produced from polyvinyl butyral, phenoxy resins, polyamides and polysulfones.

In the following, the present invention are illustrated in greater detail by examples, reference examples and comparison examples.

REFERENCE 1

1921 g (10 mols) of trimellitic anhydride was dispersed in 6000 g of cresol. A solution of 991 g (5 mols) of 4,4'-diaminodiphenylmethane in 3000 g of cresol was slowly added dropwise thereto. The temperature was elevated up to 150°C over 3 hours. The reaction was carried out at that temperature for 3 hours. After cooled, light yellow fine crystals were precipitated. The crystals were washed with acetone few times and separated by filtration to produce diimide-dicarboxylic acid.

REFERENCE 2

Diimide dicarboxylic acid was produced by the same manner as in Reference 1 by reacting 1921 g (10 mols) of trimellitic anhydride with 1001 g (5 mols) of 4,4'-diaminodiphenyl ether in cresol.

REFERENCE 3

Imide dicarboxylic acid was produced by the same manner as in Reference 1 by reacting 1921 g (10 mols) of trimellitic anhydride with 1371 g (10 mols) of p-aminobenzoic acid in cresol.

REFERENCE 4

Diimide dicarboxylic acid was produced by the same manner as in Reference 1 by reacting 1091 g (5 mols) of pyromellitic acid anhydride with 1371 g (10 mols) of p-aminobenzoic acid in cresol.

REFERENCE 5

384 g (2 mols) of trimellitic anhydride and 250 g (1 mol) of diphenylmethane-4,4'-diisocyanate were mixed with 150 g of solvent naphtha (boiling point:

165°–175°C). The mixture was allowed to reacting at 140°C for 1 hour and at 150°C for 3 hours. As the reaction proceeded, the trimellitic anhydride was dissolved to become a light yellow transparent solution. Further proceeding the reaction, it bubbled and was solidified. The resulted solid was milled to produce a dibasic carboxylic acid having 5-membered imide rings.

REFERENCE 6

2 g of N-methyl-2-pyrrolidone was added to a mixture of 384 g (2 mols) of trimellitic anhydride and 252 g (1 mol) of diphenyl ether-4,4'-diisocyanate. The mixture was reacted at 120°C for 1 hour and at 140°C for another 1 hour. The resulted light yellow homogeneous transparent solution bubbled gradually and solidified. Then 150 g of solvent naphtha (boiling point: 165°–175°C) was added thereto and the mixture was heated at 150°C for 1 hour. The reaction product was milled to produce a dibasic carboxylic acid having 5-membered imide rings.

REFERENCE 7

200 g of solvent naphtha (boiling point: 150°–190°C) was added to a mixture of 384.2 g of trimellitic anhydride and 266 g of polymethylene polyphenylene isocyanate (PAPI, produced by Sumitomo Chemical Co., isocyanate value: 133.5)

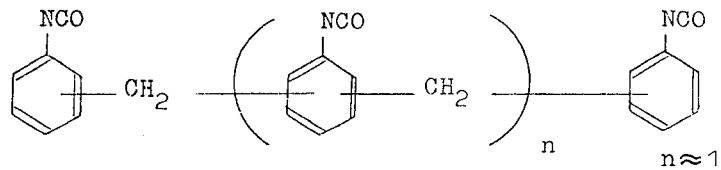

The mixture was reacted at 140°C for 3 hours and at 150°C for 2 hours to produce a dark brown material. This was milled to produce a polycarboxylic acid having 5-membered imide rings.

REFERENCE 8

200.2 g (1.0 mol) of 4,4'-diaminodiphenyl ether was dissolved in 1500 g of N-methyl-2-pyrrolidone and the solution was cooled by ice. Then 218.1 g (1.0 mol) of pyromellitic anhydride was slowly added thereto while cooling the reaction container to produce a viscous polymer solution. This solution was diluted by adding 500 g of N,N-dimethylacetamide to produce a polyimide wire enamel.

REFERENCE 9

192 g (1.0 mol) of trimellitic anhydride and 250 g (1.0 mol) of diphenylmethane-4,4'-diisocyanate were added to a mixture of 630 g of N-methyl-2-pyrrolidone and 270 g of solvent naphtha (Swazol No. 1000, produced by Maruzen Petro-Chemical Co.). After reacting at 80°C for 3 hours, the mixture was heated up to 165°C over 6 hours. The reaction was carried out at that temperature for 2 hours to produce a polyamide-imide wire enamel.

REFERENCE 10

486 g (5.0 mol) of dimethyl terephthalate, 154 g (5.0 equivalents) of glycerine, 155 g (5.0 equivalents) of ethylene glycol, 0.3 g of cadmium acetate and 300 g of xylene were mixed with stirring. The mixture was reacted at 130°–140°C for 5 hours while removing distillates having a lower boiling point. The temperature was gradually elevated up to 240°C while removing the distillate having a lower boiling point. When the reaction product became viscous, cresol was added so as to be 40% of the solid content. To this solution, 4% by weight based on the whole solid resin content of tetrabutyl titanate was added, and the mixture was stirred to produce a wire enamel.

REFERENCE 11

243 g (2.5 equivalents) of dimethyl terephthalate, 155 g (5.0 equivalents) of ethylene glycol, 436 g (5.0 equivalents) of tris-(2-hydroxyethyl)-isocyanurate, 0.2 g of litharge and 250 g of xylene were mixed with stirring. The mixture was reacted by heating to 140°–170°C. The temperature was elevated to 180°C while removing distillate having a lower boiling point. Then 683 g (2.5 equivalents) of the dibasic carboxylic acid having 5-membered imide rings of Reference 5 was slowly added thereto. The temperature was kept to 200 C. After the dibasic carboxylic acid having 5-membered imide rings was completely absorbed in the reaction system, the temperature was gradually elevated to 230°C. When the mixture became viscous, cresol was added so as to have 35% of the solid resin content to produce a solution. To this solution, 2% by weight based on the whole solid resin content of tetrabutyl titanate was added with stirring to produce a wire enamel.

REFERENCE 12

340 g (3.5 equivalents) of dimethyl terephthalate, 155 g (5.0 equivalents) of ethylene glycol, 154 g (5.0 equivalents) of glycerine, 0.4 g of litharge and 300 g of xylene were mixed with stirring. The mixture was reacted for 5 hours by heating to 140°–170°C. The temperature was gradually elevated to 180°C. Then 410 g (1.5 equivalents) of the dibasic carboxylic acid having 5-membered imide rings of Reference 5 was added slowly thereto. The temperature was kept to 200°C. After the dibasic carboxylic acid having 5-membered imide rings was completely absorbed in the reaction system, the temperature was gradually elevated to 240°C. When mixture became sufficiently viscous, cresol was added so as to produce a solution having 40% of the solid resin content. Further, solvent naphtha (swazol No. 1000, produced by Maruzen Petro-Chemical Co.) was added thereto to produce a solution having 35% of the solid content.

To this solution 3% by weight based on the whole solid resin content of tetrabutyl titanate was added to produce a wire enamel.

REFERENCE 13

240 g of polyethylene terephthalate (Mylar film, produced by Du Pont Co.), 154 g (5.0 equivalents) of glycerine and 0.5 g of litharge were reacted at 250°C. After the polyethylene terephthalate was completely dissolved, the temperature was reduced to 180°C. After added 155 g (5.0 equivalents) of ethylene glycol thereto, 683 g (2.5 equivalents) of the dibasic carboxylic acid having 5-membered imide rings of Reference 5 was gradually added. The reaction was carried out at 200°C. After the dibasic carboxylic acid having 5-membered imide rings was dissolved, the temperature was elevated up to 240°C while removing distillate under vacuum. When the mixture became sufficiently viscous, cresol was added to produce a solution having 35% of the solid resin content. Then 4% by weight of tetrabutyl titanate based on the whole solid resin content was added thereto to produce a wire enamel. During the reaction the distillate having a lower boiling point was removed, if desired.

REFERENCE 14

A wire enamel was produced by the same manner as in Reference 12 but used 291 g (3.0 equivalents) of dimethyl terephthalate, 171 g (5.5 equivalents) of ethylene glycol, 138 g (4.5 equivalents) of glycerine, 0.2 g of litharge, 250 g of xylene and 683 g (2.5 equivalents) of dibasic carboxylic acid having 5-membered imide rings of Reference 5.

REFERENCE 15

A wire enamel was produced by the same manner as in Reference 13 but used 192 g of polyethylene terephthalate (Tetoron fibers, produced by Teijin Limited), 154 g of glycerine (5.0 equivalents), 0.2 g of cadmium acetate, 155 g of ethylene glycol (5.0 equivalents) and 819 g (3.0 equivalents) of the dibasic carboxylic acid having 5-membered imade rings of Reference 5.

REFERENCE 16

243 g (2.5 equivalents) of dimethyl terephthalate, 171 g (5.5 equivalents) of ethylene glycol, 138 g (4.5 equivalents) of glycerine, 576 g of trimellitic acid anhydride, 297 g of 4,4'-diaminodiphenylmethane, 1500 g of cresol, 300 g of xylene and 0.5 g of cadmium acetate were mixed. The mixture was gradually heated while removing materials having a low boiling point. When the temperature reached 210°C, it was kept for 5 hours. The temperature was then elevated to 240°C to remove cresol in vacuum. When the mixture became sufficiently viscous, cresol was added to produce a solution having 35% of the solid content. Then 2% by weight of tetrabutyl titanate based on the whole solid resin content was added thereto to produce a wire enamel.

REFERENCE 17

A wire enamel was produced by the same manner as in Reference 12 but used 146 g (1.5 equivalents) of dimethyl terephthalate, 155 g (5.0 eqivalents) of ethylene glycol, 154 g (5.0 equivalents) of glycerine, 0.2 g of litharge, 250 g of xylene and 956 g (3.5 equivalents) of the diimide dicarboxylic acid of Reference 1.

REFERENCE 18

A wire enamel was produced by the same manner as in Reference 13 but used 192 g of polyethylene terephthalate (Lumirror film, produced by Toray Industries, Inc.), 138 g (4.5 equivalents) of glycerine, 0.7 g of litharge, 171 g (5.5 equivalents) of ethylene glycol and 959 g (3.5 equivalents) of the diimide dicarboxylic acid of Reference 2.

REFERENCE 19

A wire enamel was produced by the same manner as in Reference 12 but used 146 g (1.5 equivalents) of dimethyl terephthalate, 171 g (5.5 equivalents) of ethylene glycol, 138 g (4.5 equivalents) of glycerine, 0.4 g of litharge, 300 g of xylene and 1092 g (4.0 equivalents) of the dibasic carboxylic acid containing 5-membered imide rings of Reference 5.

REFERENCE 20

310 g (10.0 equivalents) of ethylene glycol, 154 g (5.0 equivalents) of glycerine and 0.2 of litharge were mixed and heated to 180°C with stirring. Then 1365 g (5.0 equivalents) of the dibasic carboxylic acid having 5-membered imide rings of Reference 5 was slowly added thereto, while the temperature was elevated gradually to 220°C. The stirring was continued at that temperature. After the dibasic carboxylic acid having 5-membered imide rings was completely absorbed in the reaction system, the temperature was elevated to 240°C. When the mixture became sufficiently viscous, cresol was added thereto to produce a solution having 35% of the solid resin content. Then 2% by weight of tetrabutyltitanate based on the whole solid resin content was added thereto with stirring to produce a wire enamel.

REFERENCE 21

A wire enamel was produced by the same manner as in Reference 12 but used 340 g (3.5 equivalents) of dimethyl terephthalate, 217 g (7.0 equivalents) of ethylene glycol, 92 g (3.0 equivalents) of glycerine, 0.5 g of litharge, 300 g of xylene and 956 g (3.5 equivalents) of the dibasic carboxylic acid having 5-membered imide rings of Reference 5.

REFERENCE 22

A wire enamel was produced by the same manner as in Reference 12 but used 437 g (4.5 equivalents) of dimethyl terephthalate, 279 g (9.0 equivalents) of ethylene glycol, 31 g (1.0 equivalent) of glycerine, 0.5 of litharge, 300 g of xylene and 1229 g (4.5 equivalents) of the dibasic carboxylic acid having the 5-membered imide rings of Reference 5.

COMPARISON 1

The polyimide wire enamel produced by Reference 8 was applied to a copper wire having 1.0 mm of the diameter by a common method and baked. This treatment was repeated several times to form a film having 0.040 mm of the thickness. Properties of the resulted polyimide insulated wire are shown in Table 1.

COMPARISONS 2 – 11

Wires having the structure shown in the following table were produced by the same manner as in Comparison 1.

|  | Used wire enamel | Thickness of film (mm) | Chemical structure of insulating layer |
| --- | --- | --- | --- |
| Comparison 2 | Reference 8 | 0.035 | Polyimide |
| Comparison 3 | Reference 9 | 0.038 | Polyamide-imide |
| Comparison 4 | Reference 10 | 0.039 | Polyester |
| Comparison 5 | Reference 11 | 0.041 | Polyester-imide |
| Comparison 6 | Reference 12 | 0.035 | Polyester-imide |
| Comparison 7 | Reference 15 | 0.042 | Polyester-imide |
| Comparison 8 | Reference 16 | 0.039 | Polyester-imide |
| Comparison 9 | Reference 20 | 0.038 | Polyester-imide |
| Comparison 10 | Reference 21 | 0.043 | Polyester-imide |
| Comparison 11 | Reference 21 | 0.040 | Polyester-imide |

Properties of the insulated wires produced by Comparison examples are shown in Table 1.

COMPARISON 12

The polyamide-imide wire enamel produced by Reference 9 was applied to a copper wire having 1.0 mm of the diameter and baked. This treatment was repeated several times to form a film having 0.008 mm of the thickness. Then, the polyester wire enamel produced by Reference 10 was applied to the coated wire and baked. This treatment was repeated several times to form a film having 0.032 mm of the thickness. This total thickness became 0.040 mm.

When solderability of the resulted insulated wires was examined at 420°C, 450°C and 480°C, it was impossible in each case to carry out soldering after elapsed 60 seconds.

COMPARISONS 13 – 21

Insulated wires having the structure shown in the following table were produced by the same manner as in Comparison 12. The insulated wires in Comparisons 13 - 21 had a polyimide or polyamide-imide insulating layer as an under layer and a polyester-imide insulating layer as an over layer.

|  | Polyimide or polyamide-imide under insulating layer | | Polyester-imide over insulating layer | | Total thickness (mm) |
| --- | --- | --- | --- | --- | --- |
|  | Used wire enamel | Thickness (mm) | Used wire enamel | Thickness (mm) |  |
| Comparison 13 | Reference 9 | 0.005 | Reference 11 | 0.031 | 0.036 |
| Comparison 14 | Reference 8 | 0.032 | Reference 12 | 0.008 | 0.040 |
| Comparison 15 | Reference 8 | 0.008 | Reference 13 | 0.033 | 0.041 |
| Comparison 16 | Reference 9 | 0.012 | Reference 14 | 0.025 | 0.037 |
| Comparison 17 | Reference 9 | 0.025 | Reference 17 | 0.012 | 0.037 |
| Comparison 18 | Reference 8 | 0.031 | Reference 19 | 0.007 | 0.038 |
| Comparison 19 | Reference 9 | 0.032 | Reference 20 | 0.008 | 0.040 |
| Comparison 20 | Reference 9 | 0.024 | Reference 21 | 0.011 | 0.035 |
| Comparison 21 | Reference 8 | 0.010 | Reference 22 | 0.030 | 0.040 |

As the result of examinations about solderability of the insulated wires of each comparison example at 420°C, 450°C and 480°C of the solder temperature, it was impossible in each case to carry out soldering after elapsed 60 seconds.

COMPARISON 22

The polyester wire enamel produced by Reference 10 was applied to a copper wire having 1.0 mm of the diameter and baked. This treatment was repeated several times to form a film having 0.034 mm of the thickness. Then the polyamide-imide wire enamel produced by Reference 9 was applied thereto and baked. This treatment was repeated several times to form a film having 0.006 mm of the thickness. Total thickness of the films was 0.040 mm. Properties of the resulted insulated wire are shown in Table 2.

COMPARISON 23

The polyester-imide wire enamel produced by Reference 11 was applied to a copper wire having 1.0 mm of the diameter and baked. This treatment was repeated several times to form a film having 0.035 mm of the thickness. Then, the polyimide wire enamel produced by Reference 8 was applied thereto and baked. This treatment was repeated to form a film having 0.006 mm of the thickness. Total thickness of the films was 0.041 mm. Properties of the resulted insulated wire are shown in Table 2.

EXAMPLE 1

The polyester-imide wire enamel produced by Reference 12 was applied to a copper wire having 1.0 mm of the diameter and baked. This treatment was repeated several times to form a film having 0.031 mm of the thickness. Then, the polyimide wire enamel produced by Reference 9 was applied thereto and baked. This treatment was repeated several times to form a film having 0.007 mm of the thickness. Total thickness of the films was 0.038 mm. Properties of the resulted insulated wire are shown in Table 2.

EXAMPLES 2 – 11

Insulated wires having a polyester-imide insulating layer as an under layer and a polyimide or polyamide-imide insulating layer as an over layer were produced by the same manner as in Example 1 but used the following combinations.

|  | Polyester imide under insulating layer | | Polyimide or polyamide-imide over insulating layer | | Total thickness (mm) |
| --- | --- | --- | --- | --- | --- |
|  | Used wire enamel | Thickness (mm) | Used wire enamel | Thickness (mm) |  |
| Example 2 | Reference 13 | 0.031 | Reference 8 | 0.008 | 0.039 |
| Example 3 | Reference 14 | 0.036 | Reference 9 | 0.006 | 0.042 |
| Example 4 | Reference 15 | 0.030 | Reference 8 | 0.010 | 0.040 |
| Example 5 | Reference 16 | 0.032 | Reference 9 | 0.008 | 0.040 |
| Example 6 | Reference 17 | 0.029 | Reference 8 | 0.007 | 0.036 |
| Example 7 | Reference 18 | 0.030 | Reference 9 | 0.006 | 0.036 |
| Example 8 | Reference 19 | 0.025 | Reference 8 | 0.008 | 0.033 |
| Example 9 | Reference 20 | 0.033 | Reference 8 | 0.009 | 0.042 |
| Example 10 | Reference 21 | 0.032 | Reference 9 | 0.008 | 0.040 |
| Example 11 | Reference 22 | 0.025 | Reference 8 | 0.012 | 0.037 |

Properties of the resulted insulated wires are shown in Table 2.

Table 1

|  | Solderability (second) Temperature of solder | | |
| --- | --- | --- | --- |
|  | 420°C | 450°C | 480°C |
| Comparison 1 | more than 60 | more than 60 | more than 60 |
| Comparison 2 | more than 60 | more than 60 | more than 60 |
| Comparison 3 | more than 60 | more than 60 | more than 60 |
| Comparison 4 | more than 60 | more than 60 | more than 60 |
| Comparison 5 | more than 60 | more than 60 | more than 60 |
| Comparison 6 | more than 60 | 55 | 28 |
| Comparison 7 | 10 | 5 | 3 |
| Comparison 8 | 8 | 4 | 3 |
| Comparison 9 | 12 | 5 | 4 |
| Comparison 10 | 5 | 3 | 3 |
| Comparison 11 | 5 | 3 | 2 |

Table 2

|  | Solderability Temperature of solder | | | Heat shock property (good diameter time) 200°C, 2 hours |
| --- | --- | --- | --- | --- |
|  | 420°C | 450°C | 480°C |  |
| Comparison 22 | more than 60 | more than 60 | more than 60 | 4d |
| Comparison 23 | more than 60 | more than 60 | more than 60 | 1d |
| Example 1 | more than 60 | 55 | 30 | 2d |
| Example 2 | 12 | 5 | 4 | 1d |
| Example 3 | 12 | 5 | 4 | 1d |
| Example 4 | 15 | 6 | 4 | 1d |
| Example 5 | 10 | 5 | 3 | 1d |
| Example 6 | 11 | 5 | 4 | 1d |
| Example 7 | 9 | 5 | 3 | 1d |
| Example 8 | 10 | 5 | 4 | 1d |
| Example 9 | 11 | 5 | 4 | 2d |
| Example 10 | 9 | 4 | 3 | 1d |
| Example 11 | 9 | 4 | 3 | 1d |

EXAMPLE 12

100 parts by weight of Phenoxy (PKHH, Produced by Union Carbide Corp.) were dissolved in 400 g of m-cresol to produce a bondable enamel. This bondable enamel was applied to the insulated wire produced by Example 2 and baked to form a self-binding layer having 15 μ of the thickness.

The resulted self-binding magnet wire was wound to make a helical coil having 6 mm of the inside diameter and bound at 600 g load at 170°C for 20 minutes. When determined by ASTM D 2519, bond strength at the normal temperature was 20 kg. Solderability of the self-binding magnet wire produced by this example was 14 seconds at 420°C of the solder temperature, 7 seconds at 450°C and 6 seconds at 480°C.

While the invention has been described in detail and with reference to specific embodiments thereof, it will be apparent to one skilled in the art that various changes and modifications can be made therein without departing from the spirit and scope thereof.

What is claimed is:

1. A solderable and thermostable insulated wire which comprises an insulating layer as an under layer which is formed by applying a polyester-imide wire enamel which includes polyester-imide or polyesteramide-imide and has 5-membered imide groups and ester bonds in the molecule to a conductor and baking, wherein said polyester-imide wire enamel mainly comprises the reaction product of (A) a dibasic carboxylic acid free of a 5-membered imide ring, a derivative thereof or a mixture thereof, (B) a dibasic carboxylic acid which has at least one 5-membered imide ring, a derivative thereof or a mixture thereof, (C) a tri- and-/or higher-hydric aliphatic alcohol and (D) a dihydric alcohol, the equivalent proportions and said components (A), (B), and (C) being 10 to 40 equivalents % for said component (A), 20 to 50 equivalent % for said component (B) and 40 to 55 equivalent % for said component (C), and an insulated layer as an over layer which is formed by applying a polyimide wire enamel or a polyamide-imide wire enamel to said under layer and baking.

2. A self-bonding magnet wire comprising the insulated wire of claim 1 having a self-bonding layer thereon.